C. E. TOWNLEY.
THILL COUPLING.
APPLICATION FILED JAN. 11, 1910.
1,062,671.
Patented May 27, 1913.
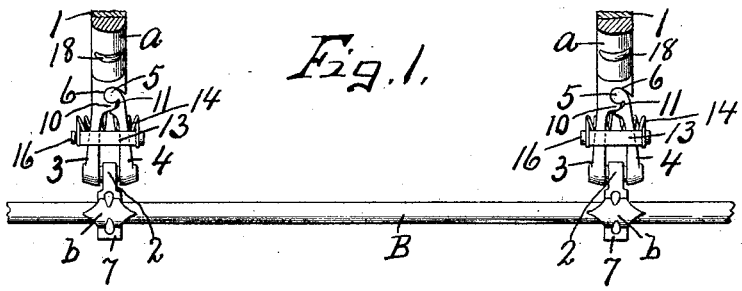
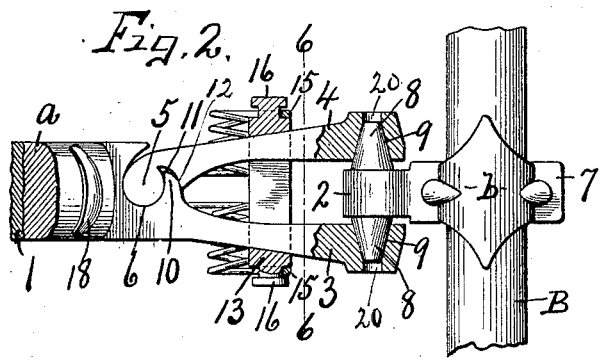
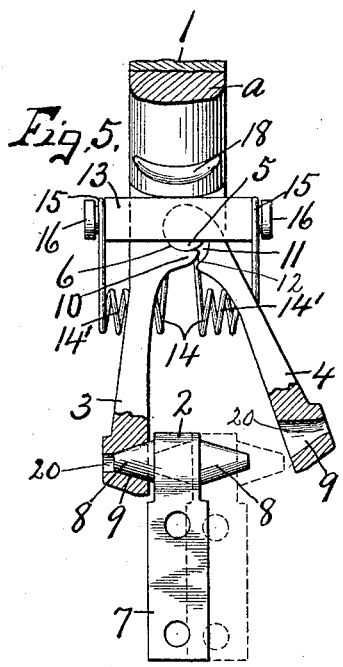
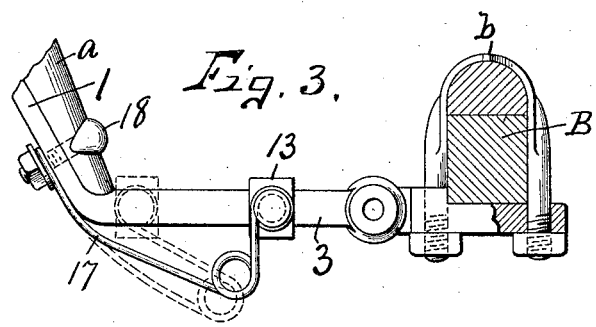
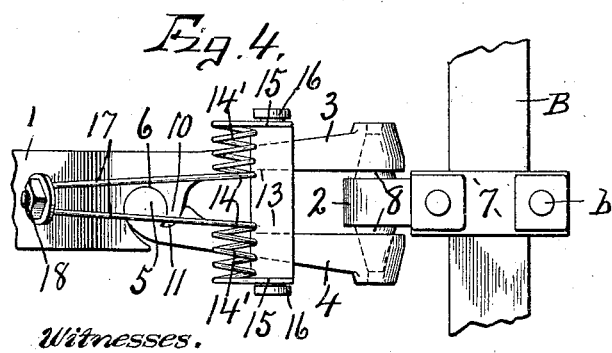
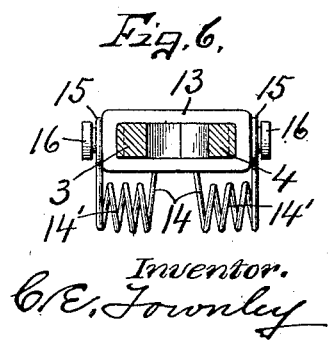
Witnesses.
A. C. Thomas
H. E. Chase
Inventor.
C. E. Townley
By
Howard P. Denison
Attorney.

UNITED STATES PATENT OFFICE.

CHARLES E. TOWNLEY, OF DRYDEN, NEW YORK.

THILL-COUPLING.

1,062,671.   Specification of Letters Patent.   Patented May 27, 1913.

Application filed January 11, 1910. Serial No. 537,439.

*To all whom it may concern:*

Be it known that I, CHARLES E. TOWNLEY, a citizen of the United States of America, residing at Dryden, in the county of Tompkins, in the State of New York, have invented new and useful Improvements in Thill-Couplings, of which the following, taken in connection with the accompanying drawings, is a full, clear, and exact description.

This invention relates to certain improvements in thill couplings of the quick shift type, involving the use of a pair of pivotally connected jaws having bearing faces converging toward their pivot and engaged by a sliding clamp spring pressed toward the free ends of the jaws for forcing said jaws into holding engagement with the ends of a suitable coupling pin, the sliding clamp being adapted to be moved by hand toward the pivot and against the action of the spring to release the jaws from such holding engagement with the pin.

One object of this invention is to minimize the number of parts by fitting one end of the movable jaw in an open sided bearing in the fixed jaw whereby said jaws may be readily assembled without the use of pivotal pins, bolts or extra retaining means.

Another object is to arrange the sliding connection between the clamp and jaws in such manner that the spring pressed clamp will automatically and simultaneously take up the wear of the connection between the jaws and also between the coupling pin and jaws.

A further object is to arrange the spring so that it will exert a uniform pressure upon both sides of the clamp at opposite sides of the jaws thereby maintaining the clamp in a position at substantially right angles to the line of draft.

Other objects and uses relating to specific parts of the device will be brought out in the following description.

In the drawings Figure 1 is a top plan of a portion of the front axle of a vehicle and the adjacent portion of a pair of thills showing my improved thill couplings in operative position. Fig. 2 is an enlarged top plan of one of the couplings showing the sliding clamp and bearings for the coupling pin in section. Figs. 3 and 4 are respectively a side elevation and an inverted plan of the coupling shown in Fig. 2, the jaws being closed in all of these views. Fig. 5 is a top plan similar to Fig. 2, except that the sliding clamp is shown as moved forward and the jaws are shown in their open positions. Fig. 6 is a cross sectional view taken on line 6—6, Fig. 2.

These couplings are adapted to be mounted upon or secured to the thill irons —1— of a pair of thills —*a*— for connection with suitable coupling pins which, in this instance, are secured by clips —*b*— to the front axle as —B— of a wagon. The thill coupling comprises a coupling pin —2— and a pair of jaws —3— and —4—, one of which as the jaw —4— is movable and provided at its front end with an integral journal —5— seated in an open sided bearing —6— in the fixed jaw —3—. The coupling pin —2— may be formed upon the front end of a clip plate —7— which is secured by the clip —*b*— to the axle —B— and is provided with opposite tapering members —8— which are preferably in the form of truncated cones and adapted to interlock with similarly tapering members —9— in the rear ends of the jaws —3— and —4—.

The greater portions of the journal —5— and bearing —6—, therefor, are substantially cylindrical in cross section and constitute a hinge connection between the fixed jaw —3— and movable jaw —4— to allow the latter to swing laterally or horizontally toward and away from the fixed jaw, the movable jaws being located at the same side of their respective thills —*a*—, as best seen in Fig. 1, so that when the movable jaws are swung out of engagement with the adjacent studs —8—, the thills may be readily detached by moving them laterally in the opposite direction, sufficiently to disengage the fixed jaws —3— from the corresponding studs —8—. By arranging the movable jaws at the same side of their respective coupling pins, the thills may be readily attached to or detached from said pins by lateral movement in one direction or the other without necessitating the springing of the thills. The open sides of the bearings —6— face in the same direction or toward the movable jaws and are of less distance across than the diameters of their cylindrical portions or journals —5— which are seated therein so as to prevent lateral displacement of the movable jaws from the fixed jaws. It is evident however that the cylindrical journals —5— may be readily inserted vertically into or withdrawn from their respective bearings —6—, when desired, thus forming a hinge connection without the use of separate pivots or bolts.

Just at the rear of each bearing —6— is a laterally projecting tongue —10— which tapers transversely toward the open side of the bearing —6— and enters a similar tapering groove —11— in the adjacent or inner face of the movable jaw —4— thus forming a shoulder —12— which has a sliding bearing against the rear face of the tongue —10— to additionally hold the movable jaw against undue endwise movement, sufficient clearance being left between the outer edge of the tongue —10— and base of the groove to allow take-up for wear. The outer lengthwise sides of the jaws —3— and —4— diverge rearwardly from their pivotal connection, one with the other and are engaged by a sliding clamp —13— which entirely surrounds the intermediate portions of the jaws when in operative position and is spring pressed rearwardly along said diverging sides by means of a spring —14—. This spring is located directly under the jaws and consists of opposite coaxial spring coils —14'— having upturned arms —15— bent around and fastened to suitable studs —16— on the opposite ends of the clamp —13—, the inner ends of said coils being preferably united forming a central lengthwise loop —17— extending forward some distance beyond the coils and attached to the under side of the thill iron by one of the bolts, as —18—, by which the thill iron is secured to the thill. The clamp —13— consists of an open frame having its opening of substantially the same vertical depth as the vertical thickness of the jaws at the rear of the portions in which the sockets —9— are formed. The transverse width of said opening is substantially equal to the transverse distance from outside to outside of the intermediate portions of the jaws when in their operative positions, as best seen in Fig. 2, so as to allow said clamp to move rearwardly along the inclined sides under pressure of the spring —14— for the purpose of moving said jaws toward each other to insure a close fit and to take up wear between the jaws and coupling pin. This ability of the jaws to move toward each other to compensate for wear is facilitated by leaving the outer ends of the sockets —9— open at —20— to allow the small ends of the tapering studs —8— to enter said openings —20—, as the contacting faces of the tapering studs and sockets wear. The inner faces of the sides of the clamp —13— also converge forwardly in substantially the same planes as the adjacent side faces of the jaws with which they are engaged, when said jaws are locked to the coupling pin, the object of which is to afford an easy sliding fit and comparatively long bearing between the clamp and jaws.

The transverse width of the thill iron, or fixed jaw, at the point of its connection with the movable jaw, is somewhat less than the corresponding width of the opening in the clamp —13— to allow the latter to be moved forwardly into registration with or slightly beyond the journal —5— and its bearing —6— and thereby allow the movable jaw to be rocked or swung laterally out of holding engagement with the corresponding stud —8— and enough farther to leave a clear opening between the rear ends of the jaws equal to or slightly greater than the distance from point to point of the opposite cone bearings —8—. The thills may then be moved laterally to withdraw the coupling pin from the sockets —9— in the fixed jaws —3—, as shown by dotted lines in Fig. 5.

When the parts of the coupling are first assembled to bring the jaws —3— and —4— into close fitting engagement with the cone studs —8—, sufficient clearance is left between the faces of such jaws and the bases of the cone studs —8— to allow them to take up wear, as the thill coupling is used. It is now clear that the clamp frame —13— engages the jaws between their hinged connection, one with the other, and with the coupling pin and that said clamp frame, not only holds the jaws against springing apart when adjusted for use, but also serves to continually press said jaws into engagement with the respective projections —8— of the coupling pin, thereby taking up wear between the jaws and coupling pin and also similarly taking up the wear at the hinged connection of said jaws, one with the other. The position to which the clamp member —13— is adjusted against the action of the spring —14— when adjusting the jaws to or removing them from the coupling pin is indicated by dotted lines, in Fig. 3 and by full lines in Fig. 5.

What I claim is:

A thill coupling comprising a pair of jaws, one of said jaws adapted to be fixedly secured at one end to the thill and having its inner side provided with a vertically disposed substantially cylindrical socket having an open side, the other jaw being movable and provided with a cylindrical journal, slidable vertically into said socket and of greater diameter than the width of the open side of the socket, means for securing the other end of said jaws to a coupling member comprising a clamp slidable on said jaws and spring pressed to hold the same in an engagement with the coupling member, and at the same time prevent the removal of the cylindrical journal from its socket.

In witness whereof I have hereunto set my hand this sixth day of January, 1910.

CHARLES E. TOWNLEY.

Witnesses:
H. E. CHASE,
A. L. HUMPHREY.

Copies of this patent may be obtained for five cents each, by addressing the "Commissioner of Patents, Washington, D. C."